Figure 1:
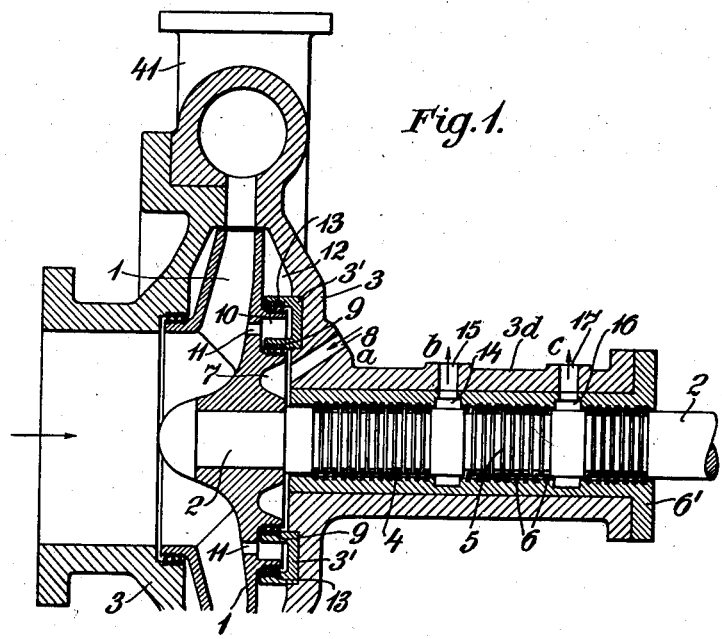

Jan. 1, 1935.  W. BEYER  1,986,706

LABYRINTH PACKING

Filed July 24, 1931

Inventor
Wilhelm Beyer
By Wilhelm C. Linton
Attorney

Patented Jan. 1, 1935

1,986,706

UNITED STATES PATENT OFFICE 1,986,706

LABYRINTH PACKING

Wilhelm Beyer, Vitkovice-Zelezarny, Czechoslovakia

Application July 24, 1931, Serial No. 553,017
In Germany July 24, 1930

7 Claims. (Cl. 286—10)

This invention relates to a labyrinth packing for sealing against the pressure of saturated steam, especially in high-pressure steam plants.

The invention resides in that a closure or seal formed by superheated steam is arranged in series with the members constituting the labyrinth packing, the arrangement being such, that this packing operates not in connection with saturated steam but with superheated one. It is suited to the purpose to separate the space containing the superheated steam employed as closure or seal from the pressure space to be packed or sealed by means of an intermediate packing in order to ensure the sealing action of the superheated steam, and to avoid the necessity of limiting the pressure of this steam either to a certain definite pressure or to narrow limits of pressure. The place where the superheated steam is tapped is preferably so chosen that the pressure of the superheated steam is a little higher than the pressure in the pressure space to be packed or sealed. If superheated steam of a higher pressure is not available, steam with a somewhat lower pressure may be used as checking steam without a perceptible diminution of the effect. Said intermediate packing must be dimensioned corresponding to the ratio of the pressures existing in the pressure space and the sealing space for the superheated steam. This ratio should also have regard to the temperature of the checking steam, if it should be possible to choose steam having a certain distinct temperature.

I am aware of the fact that the use of separate sealing means in connection with stuffing boxes and with labyrinth packings is known. There have been designed, for instance, packings for use in connection with a fluid at a high temperature in which cold water is used as means for preventing a detrimental action due to the effects of temperature and changes of temperature, stuffing boxes provided for the packing of spaces under vacuo, for instance the suction spaces of pumps, so as to prevent atmospheric air from entering into the respective spaces, are always provided with a liquid seal, or a sealing liquid. In the case of labyrinth packings for those spaces of steam turbines in which the pressure is below atmospheric pressure steam with a pressure slightly above atmospheric pressure is used as sealing fluid.

With the known devices the temperature of the sealing fluid is always low. This fluid may be different from that in the space to be sealed or packed, as is the case, for instance, with spaces under vacuo, or it may be a fluid of the same kind or nature, but in another state. In contradistinction thereto, the present invention consists in combining with a labyrinth packing intended for the sealing of saturated steam under a higher pressure than atmospheric pressure a separate sealing space containing superheated steam, the sealing fluid being, thus, in this case the same as that to be sealed or packed and also its state being the same, but the temperature of the first-mentioned fluid being considerably higher. In any case, especially as regards high-pressure steam plants, a considerable reduction of the losses by leakage steam, as well as a reduction of the corrosions and erosions in the labyrinth-forming members, is attained. Furthermore, owing to the better quality of the leakage steam, it is rendered possible to utilize this steam considerably more advantageously.

Figure 2:
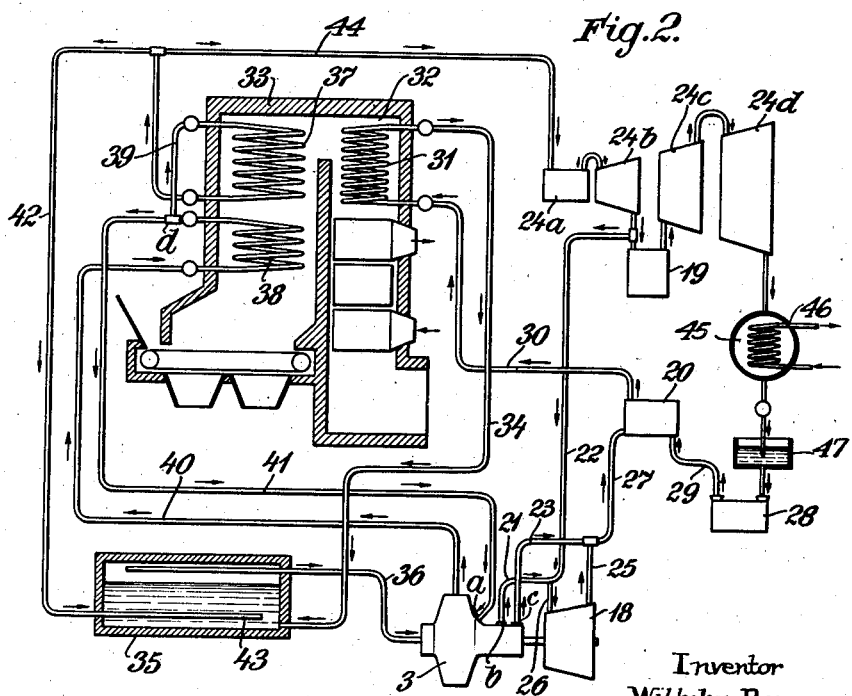

In order to make my invention more clear, I refer to the accompanying drawing in which a constructional form thereof is shown diagrammatically and by way of example, and on which Figure 1 is an axial section through a labyrinth packing designed according to this invention, together with parts of a steam-circulation pump, and Figure 2 is a representation of a complete plant, in which said pump with its labyrinth packing forms one of the operating main parts. Concerning this plant I refer to the United States Patent No. 1,740,254, in which that plant is dealt with in detail. That plant does not form a part of the present invention and is, therefore, not claimed in the present application, but it is also described therein in such a measure that the invention can be fully understood.

On the drawing, 1 (Fig. 1) denotes the rotor of a steam circulation pump; 3 is the casing of this pump, and 2 the shaft to which said rotor 1 is affixed. This shaft passes through a bushing 6' located in a sleeve-like extension 3$^d$ of the pump casing 3. The shaft is provided with a comparatively large plurality of annular grooves 5 forming between them collars, and the bushing is provided with collars 6 engaging said grooves, these parts 5 and 6 together forming the labyrinth packing 4.

By providing the collars 6 in the separate bushing 6', the pump casing may be made in one piece and a two-part pump casing which would otherwise be necessary can be avoided.

An annular chamber 7 is arranged in series with the labyrinth packing 4, as shown in Fig. 1, and this chamber communicates with a bore 8 provided in the casing 3 and being fed with superheated steam introduced therein at $a$ (Figs.

1 and 2), the labyrinth packing operating, thus, not in connection with saturated steam, but with superheated one.

The chamber 7 with its contents of superheated steam is separated from the pressure space of the casing 3 by an intermediate packing 9 also designed as a labyrinth packing and formed with the aid of a hollow ring 3', the closed side of which is inserted into that wall of the casing adjacent the sleeve 3$^d$, and a coacting annulus on the rotor 1. The hollow ring 3' also forms with another annulus on the rotor 1 a labyrinth packing 13 which seals the annular chamber 10 thus formed from the clearance space 12 of the pump. The chamber 10 communicates with the suction chamber of the pump through bores 11 formed in the rotor. Instead of the bores 11, a by-pass may lead from the inner space 10 of the ring 3' to the suction side of the pump. Owing to the constructional form of the intermediate packing 9 and also of the packing 13, the length of the packing device as a whole, and therefore the total length of the pump, becomes shorter.

This main packing is, in the example shown, subdivided into three sections separated from one another by annular chambers 14 and 16 communicating with bores $b$ and $c$ of the sleeves 6' and 3$^d$. A part of the leakage steam is withdrawn at $b$ (Figs. 1 and 2), or 15 (Fig. 1) respectively, and is conducted to the corresponding stage of a two-stage or multi-stage engine in order to do work, as will be more fully dealt with in connection with Fig. 2, that steam requiring no particular preliminary treatment in order to be suited for the object in view. The remainder of the leakage steam is withdrawn at $c$ (Figs. 1 and 2), or 17 (Fig. 1) respectively; its pressure is nearly atmospheric pressure and it can be utilized, for instance, for preheating the feed water for the respective plant, as is the case in the example shown in Fig. 2.

In this example the leakage steam tapped at $b$ is conducted through pipes 21 and 26 to a turbine 18 that is coupled with the steam circulating pump 1, 3 in order to drive it. The waste steam from the turbine 18 is conducted through pipes 25 and 27 to a preheater 20 for the feed water; the preheater receives water from a feed water pump 28 through a pipe 29 and the hot water is then conducted through a pipe 30 into a coil 31 located in the flue 32 of a boiler 33; the preheated feed water is further and highly heated in said coil 31, may be also evaporated, and the hot water or the steam or the mixture of both is conducted through a pipe 34 into the water space of a vessel 35, from the steam space of which extends a pipe 36 to the steam circulating pump 1, 3. The water in the vessel 35, which, in fact, is a steam generator, receives superheated steam from a coil 37 located in the top of the furnace of the boiler 33; below this coil is another coil 38 which is connected at one end with one end of the coil 37 by means of a pipe 39; the other end of the coil 38 is connected through a tube 40 with the outlet of the pump 1, 3. The steam leaving the coil 38 is divided into two currents, the one streaming through a pipe 41 to the point $a$ (Fig. 2), that is to say, to the bore 8 of the pump casing 3 and further into the chamber 7 that is arranged in series with the labyrinth packing 4, or 5, 6 respectively, as has already been described in a preceding part of this specification. It will be understood that the quantity of steam which is used for sealing purposes is quite small in amount in comparison with the quantity of steam which passes from superheater 38 to superheater 37.

The highly superheated steam leaving the coil 37 is also divided into two currents, of which the one flows through the pipe 42 to the vessel or boiler 35 and is conducted directly into the water therein contained by means of a perforated pipe 43. The other current flows through a pipe 44 to the first stage 24$^a$ of a four-stage turbine; the second stage 24$^b$ and the third stage 24$^c$ are connected with one another not directly, but by the intermediary of an intermediate superheater 19. The steam flowing from the turbine stage 24$^b$ into this superheater is also divided into two currents, the one passing into this superheater and the other passing through a pipe 22 to the turbine 18 which receives also the leakage steam coming from the point $b$ (Fig. 2). Under small loads, leakage steam taken off at $b$ from the labyrinth packing is itself sufficient to drive turbine 18, so that in this case no steam is withdrawn from the main turbine for the turbine 18. At even smaller loads, so much steam may be available from the labyrinth packing in addition to that necessary for turbine 18, that steam may flow from the labyrinth packing to the main turbine between stages 24$^b$ and 24$^c$. The steam coming from the intermediate superheater 19 flows through the turbine stages 24$^c$ and 24$^d$ and the waste steam is condensed in a condenser 45 by means of a cooling pipe 46, the condensed steam flowing finally into a collecting vessel 47 from which it is further conducted into the feed water pump 28 already mentioned in a preceding part of this specification.

I wish it to be understood that the tapping points $b$ and $c$ may be located also at other portions of the labyrinth packing 4; that is true especially of the steam tapped at $b$, in that the respective portion of the labyrinth packing should be chosen in correspondence with the purpose for which the tapped steam is intended.

I wish it further to be understood that the labyrinth packing can be used also in connection with other arrangements and combinations of parts than such a one shown in Fig. 2. This is merely a constructional form shown by way of example.

I claim:

1. In a steam plant, a machine comprising a chamber to be sealed and a labyrinth packing for sealing said chamber; a source of saturated steam at superatmospheric pressure; a conduit connecting said source with said chamber; a steam superheater; a second chamber disposed between said packing and said first chamber; and a conduit connecting said superheater with said second chamber, whereby the latter may be supplied with superheated steam.

2. In a steam plant, a machine comprising a chamber to be sealed, a labyrinth packing for sealing said chamber, a second chamber disposed between said packing and said first chamber, and an intermediate packing between said first and second chambers; a source of saturated steam at superatmospheric pressure; a conduit connecting said source with said first chamber, whereby the latter may be supplied with saturated steam at superatmospheric pressure; a steam superheater; and a conduit connecting said superheater with said second chamber, whereby the latter may be supplied with superheated steam.

3. In a steam plant, a machine comprising a casing which defines a rotor chamber to be sealed, a rotor in said chamber, a labyrinth packing for sealing said chamber, a sealing chamber disposed between said labyrinth packing and said rotor chamber, and an intermediate packing between said chambers, the cooperating parts of said intermediate packing being carried respectively by said casing and said rotor; a source of saturated steam at superatmospheric pressure; a conduit connecting said source with said rotor chamber whereby the latter may be supplied with saturated steam at superatmospheric pressure; a steam superheater; and a conduit connecting said superheater with said sealing chamber, whereby the latter may be supplied with superheated steam.

4. In a rotary pump, the combination with a space to be sealed and containing saturated steam at superatmospheric pressure and with a labyrinth packing for sealing said space, of a chamber located between said packing and said space, means for supplying said chamber with superheated steam, a second chamber located between the first mentioned chamber and said space, and means for connecting said second chamber and the suction space of said pump.

5. In a steam plant, a machine comprising a casing which defines a rotor chamber to be sealed, a rotor in said chamber, labyrinth packing for sealing said chamber, an annular sealing chamber formed between said rotor and casing, a second annular sealing chamber formed between said rotor and casing and disposed about said first sealing chamber in substantially concentric relation thereto, means connecting said second annular sealing chamber with the suction space of said pump, intermediate packing between said second annular sealing chamber and said first sealing chamber and between the former and said rotor chamber; a source of saturated steam at superatmospheric pressure; a conduit connecting said source with said rotor chamber, whereby the latter may be supplied with saturated steam at superatmospheric pressure; a steam superheater; and a conduit connecting said superheater with said sealing chamber, whereby the latter may be supplied with superheated steam.

6. In a rotary pump, the combination with a casing and a rotor, a space to be sealed and containing saturated steam at superatmospheric pressure, and with a labyrinth packing for sealing said space, of a chamber formed between said rotor and casing intermediate said packing and said space, means for supplying superheated steam to said chamber, a second chamber also formed between said rotor and casing intermediate said first mentioned chamber and said space, and means for connecting said second chamber and the suction space of said pump.

7. In a rotary pump, the combination with a casing and a rotor, a space to be sealed and containing saturated steam at superatmospheric pressure, and with a labyrinth packing for sealing said space, of a chamber formed between said rotor and casing intermediate said packing and said space, means for supplying superheated steam to said chamber, a second chamber disposed adjacent said first mentioned chamber, and an intermediate packing between said second chamber and said space, the cooperating parts of said intermediate packing being carried respectively by said casing and said rotor, and means for connecting said second chamber and the suction space of said pump.

WILHELM BEYER.